MONOLITHIC STABILIZED REFERENCE VOLTAGE SOURCE

Filed Sept. 24, 1968

INVENTORS
HORST H. BERGER
NORMAN M. CALLAGHAN, JR
KNUT K. NAJMANN
LOUIS J. RUGGERI
BY Kenneth R. Stevens
ATTORNEY United States Patent Office 3,524,125
Patented Aug. 11, 1970

3,524,125

MONOLITHIC STABILIZED REFERENCE VOLTAGE SOURCE

Horst H. Berger, Stuttgart-Feuerbach, Germany, Norman M. Callaghan, Jr., Rhinebeck, N.Y., Knut K. Najmann, Boblingen, Germany, and Louis J. Ruggeri, Exton, Pa., assignors to International Business Machines Corporation, Armonk, N.Y., a corporation of New York Filed Sept. 24, 1968, Ser. No. 762,066
Int. Cl. G05f *1/58*
U.S. Cl. 323—22 6 Claims

ABSTRACT OF THE DISCLOSURE

A reference voltage source circuit which comprises a differential type amplifier means having first and second semiconductor devices, each having first electrodes commonly coupled; an input node is connected to a second electrode of the first semiconductor device, and also to a constant voltage level setting semiconductor circuit and to a constant current source. An output node is connected to a second electrode on the second device, to an output current regulating semiconductor circuit which current regulating semiconductor circuit is connected between the output node and a third electrode on the second device. The output node provides a constant reference voltage under varying output current load conditions.

RELATED APPLICATION

The present application and U.S. patent application Ser. No. 606,939, filed Jan. 3, 1967, both having the same assignee, are related insofar as they both disclose similar type voltage level setting circuits for voltage clamping purposes.

BACKGROUND OF THE INVENTION

The present invention relates to a temperature compensated reference voltage source, and more particularly to a compensated voltage reference source of monolithic form.

In the past, standard discrete component voltage sources are usually regulated effectively by the use of Zener diodes. However, Zener diodes of acceptable characteristics cannot be fabricated in monolithic form, and thus Zener diodes may not be economically used to obtain a highly regulated source of reference potential in a monolithic circuit. Of course, simple resistive dividers are not suitable to provide a highly stabilized source of reference voltage, since they are extremely sensitive to variations in the range of the supply voltages and loading currents. It is further well known that forward biased silicon diodes can be used to provide a constant voltage. However, silicon diodes have the attendant disadvantage of possessing a high negative temperature coefficient of resistivity, which makes their use unsuited for present monolithic circuits requiring a high degree of stability irrespective of manufacturing tolerances and temperature changes. Additionally, when the breakdown characteristics of silicon diodes are employed to generate a controlled voltage the voltage output ranges are limited to particular ranges by virtue of their characteristics. A problem is created when it is necessary to generate stabilized voltages for monolithic circuits outside of the voltage breakdown range exhibited by the silicon diodes.

Often in monolithic circuits, it is necessary to generate a constant reference voltage which is coupled to a multitude of individual logic circuits in the monolithic circuit. For example, it is often necessary to compare an up or a down level with a reference voltage in order to determine whether a logic signal is in an up or down level. Conceivably, one monolithic card could require as many as 100 reference voltage levels. Due to manufacturing tolerances inherent in monolithic processes; namely, the tolerance variations with respect to resistors and transistors, it becomes almost impossible as well as costly in space to fabricate a single suitable reference level circuit for each of the logic circuits. Such a scheme would be highly unreliable due to the tolerance caused variations which would exist between the different voltage reference levels supplied to each of the logic circuits. Moreover, an attempt to supply one more complex voltage reference generator per chip or module somewhat diminishes the problem of obtaining a uniform reference voltage for a plurality of individual logic circuits, but suffers from the inherent disadvantage of noise communication which is generated by the interaction of the logic circuits and the plurality of voltage sources and the space occupied on the chip by the circuit. A systems level power supply is extremely costly and does not possess the temperature tracking feature. Thus, a voltage source having a high load handling capacity sufficient to supply all monolithic modules on one card is most desirable. In other words, one reference voltage source per card eliminates the general disadvantages of prior reference sources and more specifically the problems of noise communication and reference voltage variation mentioned above.

Additionally, it can be seen that by supplying one reference voltage source per monolithic card, a distinct advantage results in that temperature tracking is available. In other words, in logic circuits which employ emitter follower outputs, an increase in temperature causes the base-emitter voltage, $V_{BE}$, to go down and thus increase the voltage on the emitter follower output. This action essentially shifts the up and down levels to more positive voltage values. By employing a reference voltage source which also shows a corresponding positive shift in output voltage in response to the same temperature variation, the threshold difference between the reference voltage and the up or down level remains essentially constant.

In the past the advantages obtainable by mounting one reference voltage supply per card has not been obtainable due to the fact that prior reference supplies were severely hampered by limited load handling capacities; sensitivity to power supply variations; sensitivity to temperature; and extremely sensitive to large variations in bias voltages due to manufacturing tolerances.

It is an object of the present invention to provide a reference voltage source embodied in monolithic form which has an improved insensitivity to power supply variations.

It is a further object of the present invention to provide a reference voltage source in monolithic form which has improved load handling capabilities while maintaining constant voltage output signals despite load current variations.

It is another object of the present invention to provide a reference voltage source in monolithic form which is temperature compensated.

Another object of the present invention is to provide a reference voltage source in monolithic form which is adaptable for interconnection to a plurality of monolithic logic circuits and which level is made to exhibit temperature tracking qualities compatible with the logic circuits.

Another object of the present invention is to provide a reference voltage source in monolithic form which is readily adjustable to a desired output voltage value so as to offset the effect of manufacturing tolerance variations between elements.

SUMMARY OF INVENTION

The present invention provides a monolithic circuit reference voltage source including a differential amplifier means comprising a first and a second semiconductor device. An input node connected to the first device also is connected to a temperature compensated voltage level setting circuit and to a constant current source in order to set a predetermined fixed reference level or voltage at the input node. The input voltage is translated by the differential amplifier, a high current gain device, to a corresponding voltage at an output node connected to the second device of the differential amplifier. A current regulating transistor circuit is connected in series with an output load resistor so as to maintain a constant output voltage on the output node as determined by the voltage at the input node despite varying current being drawn from the output node.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
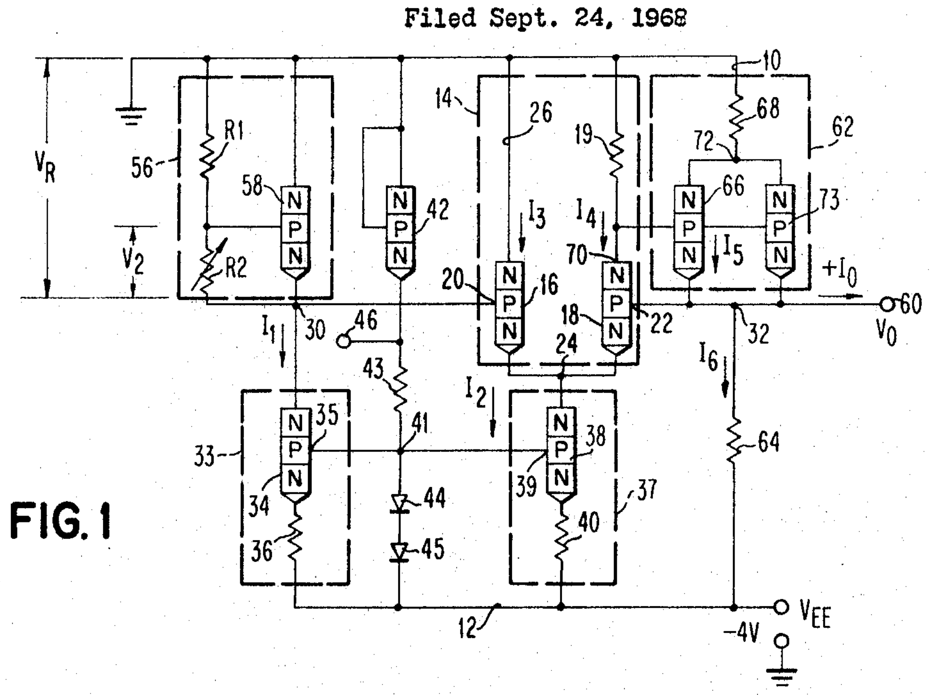
FIG. 1 is a schematic diagram of a preferred embodiment of the reference voltage source of the present invention.

Now referring to FIG. 1, it shows a preferred embodiment of the reference voltage source of the present invention. A first and a second power supply terminal 10 and 12, respectively, supply operating voltages to a differential amplifier 14 which includes a first and a second transistor 16 and 18 and a resistor 19. The pair of transistors 16 and 18 each include respective base electrodes 20 and 22, commonly coupled emitter electrodes connected at node 24. The collector electrode of transistor 16 is connected via line 26 to the power supply terminal 10, while the collector of transistor 18 is connected to the resistor 19 and then to the power supply terminal 10. An input node or terminal indicated at 30 connects to the base 22 of the first device or transistor 16. An output terminal or node 32 is connected to the base 22 of the second transistor 18.

A first constant current source switch 33 is connected between the second power supply terminal 12 and the input terminal or node 30 and includes a transistor 34, a base electrode 35, and a resistor 36 connected between its emitter electrode and the power supply terminal 12. Another constant or quasi-constant current source switch 37 connects from and supplies a source of constant current between the node 24 and the power supply terminal 12. The switch 37 includes a transistor 38 having a base electrode 39, and a resistor 40 connected between its emitter electrode and the terminal 12.

In the preferred embodiment, the first power supply terminal 10 is connected to ground, while the second power supply terminal 12 is connected to a negative source of voltage $V_{EE}$ of −4 v. Thus, it can be seen that the current switches 33 and 37 in conjunction with the negative source of potential $V_{EE}$ provide constant or quasi-constant current sources for the nodes 24 and 30, and which current is schematically shown in FIG. 1 by the arrow $I_1$ associated with the node 30, and $I_2$ associated with the node 24.

In order to turn on the current switches 33 and 37, an input turn-on voltage is provided to a node 41 and is supplied by a transistor 42 interconnected to function as a diode, a resistor 43, and a pair of serially connected diodes 44 and 45. Under the influence of $V_{EE}$, the transistor diode 42, and the pair of serially connected diodes 44 and 45, which also may be fabricated by employing the base-emitter characteristics of a transistor, will be forwardly biased so as to provide a turn-on voltage to the bases 35 and 39 of the current switches via the node 41. Although ancillary to the primary objects of the present invention, it was found that a suitable logic voltage level is obtainable from a terminal 46 in the circuitry, which is primarily employed to provide a turn-on voltage to the bases of the transistors 34 and 38. The transistor 42 functions as a diode in a conventional manner by employing its forwardly biased base-emitter characteristics. If the logic level from terminal 46 is unnecessary, transistor diode 42 is not required in the circuit of FIG. 1.

In order to provide a constant level setting voltage at the anode 30, a voltage level setting semiconductor circuit 56 is connected between the first power supply terminal 10 and the input terminal or node 30. The circuit 56 includes a transistor 58 having its collector connected to the terminal 10 and its emitter connected to the node 30. The voltage level setting circuit 56 further includes a temperature stabilized biasing network comprising a first resistor R1 connected between the first power supply terminal 10 and the base of the transistor 58, and a second resistor R2 connected between the base of the transistor 58 and the input terminal or node 30. A voltage $V_R$ between the node 30 and the first power supply terminal 10 is essentially equal to the ratio of R1 over R2. That is, $$V_R = V_2 \times \frac{R1 + R2}{R2}$$

for sufficiently high current gain of the transistor 58, where $V_2$ equals the base-to-emitter voltage of the transistor 58. Thus, it can be seen that the voltage $V_R$ can be compensated or reinforced by proper selection of the $T_K$, temperature coefficient of resistivity, of R1 and R2.

Although not shown, this can be achieved by preparing a monolithic device which employs two different types of monolithic resistors R1 and R2 according to well-known techniques. Another alternative is an integrated device with one of the resistors made either by thin film techniques or added in the form of a hybrid integrated circuit. For example, in one specific example a voltage of 1200 millivolts is achieved at the input terminal or node 30 by using a hybrid integrated circuit with R2 screened on a module substrate, while R1 is formed together with the transistor 58 on a semiconductor chip such that R1 and R2 possess the appropriate temperature coefficient of resistivity to provide the proper temperature stabilization. A high $T_K$ value is obtained for R1, in one example, by employing silicon diffused resistors formed in a relatively low doped-epitaxial region. Similarly, the $T_K$ of R2 could be appropriately selected to be approximately zero, while the $T_K$ of R1 is selected to be in a positive region. Assuming an increase in temperature, the voltage at the emitter of the transistor 58, which is connected to the node 30, would go up and thus change the input voltage to the base 20 of the transistor 16. However, the increase in temperature also causes the value of the resistance R1 to increase and thus bias the base of the transistor 58 more negative, which in turn causes the voltage at the emitter of the transistor 58 or the node 30 to decrease. Thus, it can be seen that by properly selecting a positive $T_K$ value for R1, a highly temperature stabilized transistor voltage level setting circuit 56 is obtainable.

Additionally, after the entire reference voltage source circuit is fabricated in monolithic form, the resistance value of R2 is trimmed. This is schematically shown in FIG. 1 by the fact that R2 is variable. Trimming of R2, in a conventional manner, sets the voltage level at the base 20 of the transistor 16, which in turn controls the output voltage of the node 32, as hereinafter more fully described. Obviously, varying the value of R2, simultaneously varies the base-to-emitter bias, shown as $V_2$ in FIG.

1, of the transistor 58. This adjustable feature is highly advantageous, since it allows a precise setting of the output voltage at the node 32 despite the over-all effects of tolerance variations between the various transistor and resistor elements incurred in the fabrication of the monolithic circuit. Accordingly, the constant voltage level setting semiconductor circuit 56 is variable, in addition to being temperature stabilized.

In order to maintain the output terminal or node point 32 at a constant voltage under varying load currents, shown as $I_0$, due to varying output loads being connected to the output node or terminal 32 via a point or terminal 60, a current regulating transistor circuit 62 is connected between the second power terminal 10 and the output node 32. Also connected to the output node or terminal point 32 is a load resistance 64 which has its other terminal connected to the second power terminal 12. The current regulating transistor circuit 62 includes a transistor 66 having an emitter connected to the output terminal or point 32, and a collector connected to the first power terminal 10 via a resistor 68, and a base connected to a collector terminal 70 of the second device or transistor 18.

In order to limit or distribute the current drawn by the regulating transistor circuit or means 62, additional transistors are connected in parallel to the transistor 66 between a node 72 and the output terminal or node point 32, only one of which 73 is shown, or necessary in the preferred embodiment. The value of resistor 68 is appropriately selected to limit the output current $I_0$ drawn from the point 60 by saturating the transistor 66 or additional transistors in the current regulating means 62. In addition to current flows $I_1$ and $I_2$, $I_4$ through $I_6$ have been schematically shown in order to implement the discussion of the circuit operation discussed below. It is to be further understood that any specific circuit values which are illustrated in FIG. 1, are for purposes of illustration and in no way are intended to limit the scope of the present invention. Further, in the fabrication of the monolithic circuit, large metallization spreads are formed at the bases of the transistor 66, and others such as 73 if necessary. This technique adds capacitance to ground, so as to further improve output voltage stabilization.

Figure 2:
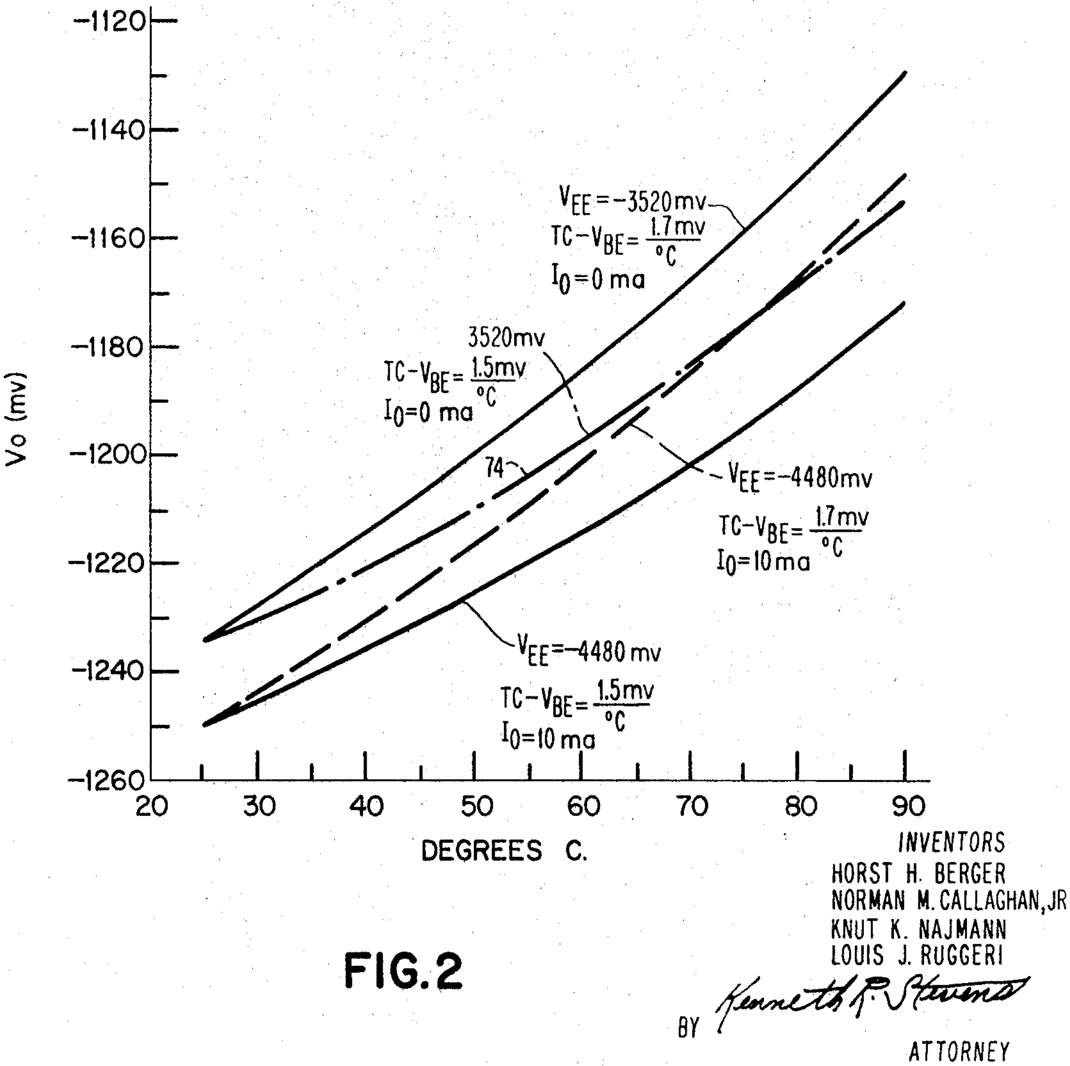
FIG. 2 is a graph showing the output voltage plotted against degrees centigrade for different voltage source circuits under varying voltage supplies and varying temperature coefficients characteristics.

Now referring to FIG. 2, it shows a plurality of curves for the output voltage $V_O$, plotted against temperature change in degrees centigrade. The four distinct curves each represent a different condition, namely each curve illustrates the situation where the supply voltage at the terminal 12. $V_{EE}$, is varied and the output voltage is measured for two different fabricated circuits. Each of the two different fabricated circuits contains semiconductor transistors having selected different temperature coefficients, TC. The temperature coefficients are selected to minimize and maximize the slopes of the curves under no load and full load current, $I_0$ flowing out of the terminal 60. In one fabricated circuit, the base-to-emiter voltage change $V_{BE}$ per degree centigrade changes is 1.7 millivolts, and the other is 1.5 millivolts. More specifically, the curve designated as 74 is obtained by supplying a voltage $V_{EE}$ of 3520 millivolts to a power supply terminal 12 on a monolithic type cicuit having a TC–$V_{BE}$ of 1.5 millivolts, and with $I_O$ equal to 0 milliamps or a no load condition. It can be seen that the output voltage $V_O$ for this particular case increases with temperatures in a different manner than the other curves, and is dependent upon the particular temperature coefficients of the transistors being employed on the monolithic circuit and on the current $I_0$ being drawn from the output terminal 60. The curves also represent or incorporate the variations due to all other temperature coefficients, for example, those of R2 and the other standard circuit resistors.

The over-all characteristics of the circuit disclosed in the preferred embodiment, and illustrated in FIG. 2, allows it to temperature track with other monolithic circuits of the emitter follower output type, which are similarly exposed to corresponding temperature changes. Although strictly speaking the $V_{BE}$ of a transistor device varies in accordance with other factors than simply temperature alone, the other variables are effectively negligible, and therefore the variation in base-to-emiter voltage of the transistor device is attributed solely to the temperature change. Thus for purposes of the present discussion, the base-to-emitter voltage change per degree centigrade, TC–$V_{BE}$, has been designated as the temperature coefficient of the transistor with respect to the base-emiter voltage.

OPERATION OF INVENTION

Reference is now made to FIG. 1 for the circuit operation of the reference voltage source of the present invention. The base or input terminal 20 to the differential amplifying type circuit 14 is connected via input node 30 to a constant voltage level setting circuit 56 and to a constant current source.

As to the constant or quasi-constant current source, the transistor switch 34 is turned on via a relatively positive voltage developed at node 41 and connected to its base 35. With transistor 34 conducting a constant current path for $I_1$ is provided from the node 30, through the conducting transistor and resistor 36 to the negative supply voltage $V_{EE}$. The relatively positive voltage generated at the node 41 is developed by the forward biased transistor diode 42 and the serially connected diodes 44 and 45 in conjunction with resistor 3 connected to the negative supply $V_{EE}$.

The node 41 similarly applies a relatively positive voltage to the base termnal 38 of the current switching circuit 37, and operates in a similar manner to the current switching circuit 33 to provide a relatively constant current $I_2$ to the node 24.

Next, it is seen that the potential at the input terminal or node 3 is maintained at a predetermined voltage level in accordance with the voltage level setting semiconductor circuit 56. More specifically, current will flow through the resistors R1 and R2 so as to forward bias the base emitter junction of the transistor 58 sufficiently to cause operation in the active region. As previously described, the voltage between the input terminal or node 30 and the first power supply terminal 10 is determined by the relative relationship of the resistance values of R1 and R2. Therefore in a well-known manner, active trimming of the resistor R2, once the over-all circuit has been fabricated, is effective to control the base-to-emitter voltage of the transistor 58, and therefore the over-all voltage $V_R$ between the node or input terminal 30 and the power supply terminal 10. The emitter of the transistor 58 when operating in an active region presents an extremely low impedance such that any variation in the flow of current $I_1$ does not affect more than a negligible drop at the input terminal or node 30.

In addition to providing a constant voltage level to the differential amplifier means 14, the voltage level setting circuit 56 is also temperature compensated. One technique is to select a resistor R1 having a high positive temperature coefficient of resistivity in relationship to the resistor R2. With an increase in temperature, the resistive value of R1 increases and simultaneously the base-to-emitter voltage of transistor 58 decreases. Proper selection of the temperature coefficient of resistivity for the resistor R1 with respect to the temperature coefficient of resistivity for the resistor R2 will cause a decrease in potential at the base of the transistor 58 which in turn causes the voltage at the node 30 to decrease from the value which resulted from an initial increase in temperature. Thus, it can be seen that the voltage level setting circuit 56 provides a temperature stabilized constant reference voltage level to the differential amplifier type circuit 14.

The output node 32 assumes an output voltage essentially identical to the input voltage applied to the differential amplifier means 14 at the base 20. This results due to the fact that the emitters of the transistors 16 and 18 which form the differential amplifier type circuit 14 are commonly connected to at the node 24, and further by virtue of the fact that the base emitter drops are essentially identical in the transistors 16 and 18. Under these conditions, the output terminal or node 32 must necessarily be at the same potential as the input voltage to the differential amplifier type circuit 14.

Under no load conditions, that is when the output point 60 is not connected to any exterior or output load, both the transistor 16 and 18 of the differential amplifier are conducting current as represented by $I_3$ and $I_4$, respectively. Under these conditions, the current $I_2$ leaving the node 24 equals the currents $I_3$ and $I_4$ entering the node. Also, the flow of current $I_4$ through the resistor 19 causes a voltage to be applied to the base of transistor 66 in the current regulating circuit 62. Thus with transistor 66 conducting, a current $I_5$, is directed to the node or output terminal 32. Under no load conditions, the current $I_6$ is substantially equal to $I_5$ since no current $I_0$ is flowing; and therefore the output terminal 32 is maintained at a constant output voltage in accordance with the input voltage or potential to the transistor 16. As previously discussed, the current $I_5$ may be shared by additional transistors, one of which is indicated at 73. However, transistors 66 and 73 operate in an identical manner in response to the potential at the collector 70 of the transistor 18.

Assuming that the output terminal point 60 which corresponds to the node 32 is connected to an output load (not shown), current $I_0$ is drawn out of the terminal 60 which in turn causes a potential drop at the node point 32 so as to tend to, or turn the transistor 18 off. When the flow of current $I_4$ decreases, the transistor 16 conducts more heavily in order that the current $I_3$ attempts to maintain the condition of constant current $I_2$ being drawn from the commonly coupled emitters of the differential amplifier at the node 24. As $I_4$ decreases, the collector 70 of the transistor 18 increases in potential which in turn causes the transistor 66 to conduct more heavily as its base is being raised to a higher potential. Increased conduction through the transistor 66 increases the flow of current $I_5$ to the node 32, and thus raises the voltage at this point. Increasing the voltage at the node 32 in turn causes the base 22 of the transistor 18 to go more positive and thus conduct more heavily, or turn back on so as to satisfy the current requirements as to the node 24.

Accordingly, the circuit regulating transistor circuit 62 operates to maintain the voltage at the output node or terminal 32 at a constant value despite increased loading at the terminal point 60. The value of resistor 68 is selected to place the transistor 66 in saturation when excessive output current $I_0$ is demanded, and thus limit the maximum output current $I_0$ that may be drawn from the voltage reference source circuit.

The transistor diode 42, resistor 43, and serially connected diodes 44 and 45 provide the switching voltage for the transistors 34 and 38. Additionally, it was found that an attendant advantage or output voltage level is obtainable from the circuit, as shown at the terminal 46, exclusive of the primary objective of obtaining a highly regulated output voltage under varying load conditions at the output terminal or node 32. The output voltage or potential level at terminal 46 is independent of the primary purposes of the over-all invention.

The present preferred embodiment provides an extremely stable reference voltage source capable of supplying a plurality of individual output loads. In actual practice, the circuit has been employed to supply over 100 separate loads. This extremely desirable advantage is obtained with the additional features of temperature stabilization, temperature tracking, and an output voltage reference source which may be readily adjusted by varying the value of R2 subsequent to fabrication, so as to offset various manufacturing tolerance deviations between circuit elements.

The degree of temperature stabilization is readily controlled by proper selection of R1 and R2 and by suitable modifications to the current sources circuits 33 and 37 so that they more nearly approach a truly constant current source. For example, by substituting a resistor for diode 45 and allowing the resistor substituted for diode 45 and/or resistor 36 to go to zero ohms, an almost perfect constant current source which is strongly dependent on the characteristics of resistor 43 and diode 42 is obtained.

While the invention has been particularly shown and described with reference to preferred embodiments thereof, it will be understood by those skilled in the art that various changes in form and details may be made therein without departing from the spirit and scope of the invention.

What is claimed is:

1. A monolithic reference voltage source circuit comprising:

(a) a first and a second power supply terminal, (b) a differential amplifier means including a first and a second semiconductor device, each having corresponding first electrodes, which are commonly coupled and are also connected to said second power supply terminal, (c) said first and second devices each having corresponding second electrodes, (d) an input node connected to said second electrode of said first device, and an output node connected to said second electrode of said second device, (e) a first current source connected between said second power supply terminal and said input node, (f) a temperature compensated voltage level setting circuit means connected between said first power terminal and said input node for providing a predetermined voltage level to said second electrode of said first device, (g) said input node being maintained at a predetermined voltage level, (h) a load resistance connected between said output node and said second power terminal, (i) a semiconductor current regulating circuit means connected between said output node and said first power terminal, (j) said second device having a third electrode connected to said current regulating circuit means and to said first power supply terminal, and (k) said output node having a predetermined reference voltage value despite an increase in current being drawn by external loads connected to said output node.

2. A monolithic reference voltage source as in claim 1 wherein the voltage level setting circuit means further includes:

(a) a transistor having a collector electrode connected to said first power terminal, an emitter electrode connected to said input node, a base electrode, and a bias network connected to said transistor, (b) said bias network including a first resistance connected between said first power supply terminal and said base, and a second resistor connected between said base and said emitter, (c) said first and second resistances having predetermined temperature coefficients of restivity, and (d) said voltage level setting circuit means is operative to maintain said input node at a voltage level in accordance with said predetermined temperature coefficients of resistivity.

3. A monolithic reference voltage source circuit as in claim 2 further including:

(a) a second current source connected between said first commonly coupled electrodes of said differential amplifier means and said second power supply terminal, (b) said semiconductor current regulating circuit further including a regulating transistor having a collector, base, and emitter, and a resistance connected between said collector of said regulating transistor and said first power supply terminal, (c) said emitter of said regulating transistor connected to said output node, and (d) said base of said regulating transistor connected to said third electrode of said second device.

4. A monolithic reference voltage source as in claim 2 wherein:

(a) wherein at least one of said first or second resistors of said bias network has a settable trimmed value so as to maintain said input node at a desired voltage level.

5. A monolithic reference voltage source circuit comprising:

(a) a first and second power supply terminal, (b) a differential amplifier means having an input and an output node connection, (c) a first current source connected between said second power supply terminal and said input node, (d) a voltage setting circuit means connected between said first power terminal and said input node, (e) said voltage setting circuit having temperature compensating means for providing a predetermined voltage level at said input node, (f) a semiconductor current regulating circuit means connected to said output node, and to said first power terminal, and (g) said output node having a predetermined reference voltage value despite an increase in current being drawn by external loads connected to said output node.

6. A monolithic reference voltage source circuit as in claim 5 wherein:

(a) said temperature compensating means includes a first and second resistor, and (b) said first and second resistor having different temperature coefficients of restivity.

References Cited

UNITED STATES PATENTS 3,443,202 5/1969 Moulton.

J D MILLER, Primary Examiner

A. D. PELLINEN, Assistant Examiner

U.S. Cl. X.R.

323—38